United States Patent [19]
Easton

[11] 3,763,492
[45] Oct. 2, 1973

[54] APPARATUS AND METHOD FOR IMPROVING SENSITIVITY OF NAVIGATION SYSTEM USING EARTH SATELLITES

[75] Inventor: Roger L. Easton, Oxon Hill, Md.

[73] Assignee: The United States of America as represented by the Secretary of the Navy, Washington, D.C.

[22] Filed: Oct. 8, 1970

[21] Appl. No.: 79,308

Related U.S. Application Data
[63] Continuation-in-part of Ser. No. 79,307, April 26, 1971.

[52] U.S. Cl. ........ 343/112 D, 325/346, 343/100 ST
[51] Int. Cl. ............................................. G01s 11/00
[58] Field of Search ................. 343/112 D, 100 ST; 325/346, 381

[56] References Cited
UNITED STATES PATENTS
2,947,985   8/1960   Cooley ..................... 343/112 D UX
3,626,311   12/1971   Kraybill .......................... 325/346 X Primary Examiner—Benjamin A. Borchelt
Assistant Examiner—Richard E. Berger
Attorney—R. S. Sciascia, Arthur L. Branning and J. G. Murray

[57] ABSTRACT

An improvement to a navigation system which includes earth satellites that carry stable oscillators which are synchronized with a stable oscillator at the navigator's station; the improvement consisting of means that improve system sensitivity and reduce the effectiveness of jamming by including in the receiver at the navigator's station a tracking oscillator which is locked onto the carrier frequency received from the satellite. The tracking oscillator output is frequency divided down and phase locked with the multifrequency tone signals that are also received from the satellite and then phase compared with similar multifrequency signals which are derived from the stable oscillator at the navigator's station.

4 Claims, 1 Drawing Figure

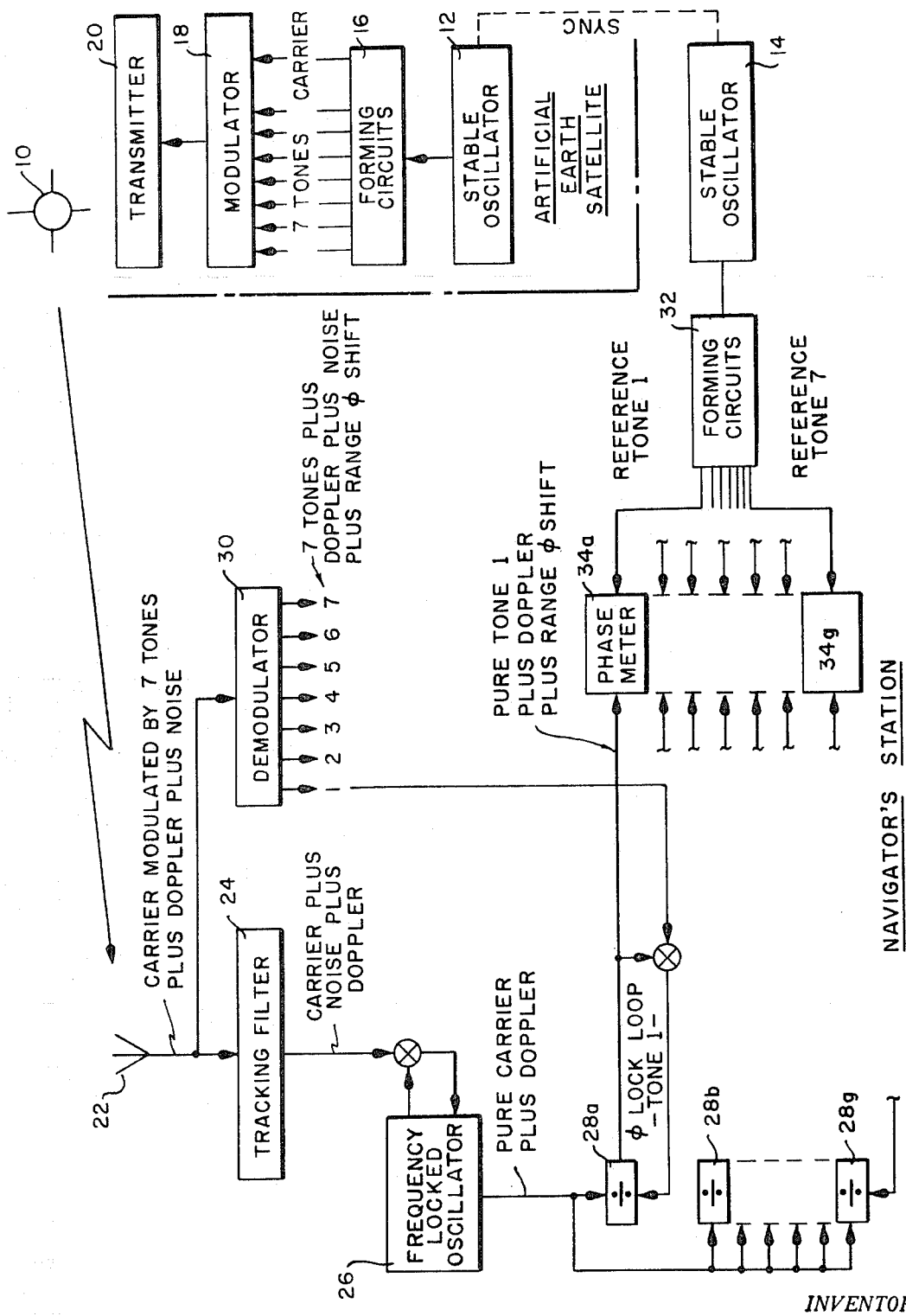

APPARATUS AND METHOD FOR IMPROVING SENSITIVITY OF NAVIGATION SYSTEM USING EARTH SATELLITES

CROSS-REFERENCE TO RELATED APPLICATIONS

This application is an improvement over and a continuation-in-part of application Ser. No. 79,307, filed Apr. 26, 1971 in the name of Roger L. Easton for a Navigation System Using Satellites and Passive Ranging Techniques.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Until recently celestial navigation techniques have provided the best available accuracy for terrestrial navigation. The introduction of artificial earth satellite navigation systems, however, has made possible an order of magnitude increase in navigational accuracy.

position such earth satellite navigation system is described in the above-mentioned patent application. In the described navigation system, extremely stable oscillators carried on earth satellites of precisely known postion are synchronized with an extremely stable oscillator at the navigator's station and the phase difference of multi-frequency tones signals derived from the extremely stable oscillators is used to measure the distances between the navigator's station and the satellites and thereby determine the location of the navigator's station.

In the described prior system the receiver at the navigator's station is routinely designed using well known techniques of heterodyning and detecting to demodulate the signal received from the satellites and thus separate from the carrier signal (and from each other) the multifrequency tone signals which are phase compared, for ranging purposes, with the locally derived tone signals. These techniques of receiver design reuire that all of the receiver circuits, including the range tone circuits, be broadbanded to the extent of providing the bandwidth necessary to accommodate the doppler frequencies which are present due to motion of both the navigator's station and the satellites. The broadband design disadvantageously degrades the system sensitivity by admitting broadband noise and also increases the possibility of successful enemy jamming of the system.

SUMMARY OF THE INVENTION

The present invention provides a method and apparatus for improving the operation of the navigation system described in the previously mentioned patent application, Ser. No. 79,307 while retaining all of the advantages and benefits thereof. More specifically, this invention improves the system sensitivity and reduces the probability of effective jamming of the described navigation system by including in the receiver at the navigator's station a tracking oscillator which is locked onto the carrier frequency of a signal received from a satellite of precisely known position and which includes modulations by multifrequency tone signals which are derived from an extremely stable oscillator which is one the satellite and which is synchronized with a similar oscillator at the navigator's station. The output of the tracking oscillator is divided down and phase locked with the multifrequency tone signals that are received as modulations of the signal from the satellite and then phase compared with similar multifrequency signals which are derived from the stable oscillator at the navigator's station. The major feature (i.e., the improved operational capability) of the present invention results primarily because the tone signals obtained by frequency division of the tracking oscillator signal are relatively very pure and noise free in comparison to the tone signals which are obtained, as in the prior system, by demodulation of the received signal.

OBJECTS OF THE INVENTION

It is therefore an object of the invention to provide an improved navigation system which includes earth satellites.

Another object of the invention is to improve the system sensitivity and reduce the probability of effective jamming of a navigation system which includes earth satellites.

A further object is the provision of an improved navigation system which includes earth satellites and wherein system sensitivity is increased and the probability of effective jamming is decreased by including in the receiver at the navigator's station a tracking oscillator which is locked onto the carrier frequency of the signal received from an earth satellite.

A still further object is to provide an improved navigation system which includes artificial earth satellites that transmit carrier signals that are modulated by tone signals derived from a stable oscillator on the satellite and wherein system sensitivity is increased and the probability of effective jamming is decreased by including in the navigator's station a tracking oscillator which is locked onto the carrier frequency of the signal transmitted by the satellite and wherein the output of the tracking oscillator is divided down and phase locked with the multifrequency tone modulations in the received signals and then phase compared with similar multifrequency signals which are derived from a stable oscillator which is synchronized with the stable oscillator on the satellite and which is located at the navigators station.

Yet another object of the invention is to provide an improved navigation system which includes artificail earth satellites and wherein system sensitivity is increased and the probability of effective jamming is decreased by including means in the receiver at the navigator's station which produce noise free tone signals that are phase locked to relatively noisy tone signals received from the satellite.

DESCRIPTION OF THE DRAWING

Other objects and features of the invention will become apparent to those skilled in the art as the disclosure is made in the following description of a preferred embodiment of the invention as illustrated in the sole drawing FIGURE which shows the invention in block diagram form.

DESCRIPTION OF THE PREFERRED EMBODIMENT

Before proceeding with a description of the preferred embodiment of the present invention, it is considered likely to benefit the reader if the navigation system disclosed in the before-mentioned patent application, Ser. No. 79,307 is briefly summarized. In the prior invention, to which the present invention provides an improvement, the navigator's station includes an extremely stable oscillator which is phase synchronized with similar stable oscillators carried on artificial earth satellites, the positions of which are precisely known to the navigator. All of the oscillators are connected to forming circuits which derive precisely identical multifrequency tone signals, typically seven in number and of frequencies 100 cps, 300 cps, 1 KC, 3 KC, 10 KC, 30 KC, and 100 KC. The forming circuits on the satellite also produce carrier signals, which for purposes of satellite signal identification, are preferably different. After being modulated by the seven tone signals, the carrier signals are then transmitted and selectively received at the navigator's station where the receiver demodulates the received signal to obtain the seven tone signals which are then phase compared to the seven tone signal derived from the output signal of the stable oscillator located at the navigator's station.

The results of the phase comparison allows the navigator to determine the distance from the satellite (which transmitted the received signal) and the navigator's station and to determine a line of postion (LOP). After similarly determining another LOP from a signal from a second satellite (or from the same satellite after it has moved sufficiently) the navigator is able to determine his position by the intersection of the two LOPs.

Proceeding now with the description of the preferred embodiment of the present invention and referring to the sole FIGURE which shows the invention in block diagram form, the artificial earth satellite 10 is shown as including an extremely stable oscillator 12 which is synchronized with a similarly stable oscillator 14 that is located at the navigator's station. The oscillators 12 and 14 and oscillators which are carried on other (not shown) satellites, that are also part of the navigation system of the present invention, are frequency stable to the degree of stability possessed by a cesium, or other atomic, clock. While the oscillator 14 at the navigator's station may well be such an atomic device, it is likely that the oscillator 12, and the other satellite carried oscillators are typically (for purposes of weight control) thoroughly compensated, oven contained electronic (crystal) oscillators.

Forming circuits 16, of any suitable form, are connected to the output signal of stable oscillator 12 and derive therefrom seven tone signals, typically 100 cps, 300 cps, 1 KC, 3 KC, 10 KC, 30 KC and 100 KC, and a carrier frequency signal which could be 400 MC. Since all of the tone and carrier signals are derived from the same source, well known design practices can be used to preserve the coherency of these signals. The carrier signal is modulated (amplitude, frequency, phase, etc) by the seven tone signals in the modulator 18 and then broadcast by the transmitter 20. The obvious variation of sequential modulations by individual tones will, no doubt, occur to the skilled reader.

Antenna 22, at the navigator's station, intercepts the signal transmitted from satellite 10. However, this intercepted signal may be in a somewhat altered form due to variations induced by atmospheric conditions, doppler effects, enemy jamming efforts, etc. Antenna 22 is connected to tracking filter 24 (that typically has a narrow pass band) which tracks the doppler caused variations in the carrier frequency and thus has an output signal which consists primarily of the doppler varied carrier frequency and a reduced amount of noise and jamming energy and that differs from the antenna signal by having a diminished amount of noise and jamming energy (because of the narrow banding characteristics of the filter) and by the elimination of tone modulations and sideband signal components. The output of tracking filter 24 is connected to a frequency locked loop which includes the frequency locked oscillator 26, the output of which is a pure signal (noise-free) at the doppler altered carrier frequency. Frequency locked oscillator 26 is in turn connected to seven variable frequency dividing devices 28a, b . . . g which reduce the doppler varied carrier frequency output signal of frequency locked oscillator 26 to the seven doppler varied tone frequencies.

Demodulator 30, which is also connected to antenna 22, similarly produces the seven doppler varied tone frequencies. However, although both sets of the seven tone signals are similar in that they both include the doppler caused frequency variations, in other respects the two sets of tone signals are markedly different. The set of tone signals produced by demodulator 30 includes noise and jamming energy and the very important phase information relating to the distance between satellite 10 and the antenna 22. The set of tone signals produced by dividing devices 28a, b . . . g, in contrast, do not include noise or jamming energy and, without further regulation, are of random phase.

As shown in the drawing, the dividing devices 28a, b . . . g are connected into phase locking loops where the output of these devices are phase locked with the seven tone signals produced by the demodulator 30. The outputs of the seven phase locking loops, only one of which is shown in the drawing, are a set of pure (noise free) tone signals which include the doppler induced variation and the ranging phase shift.

Stable oscillator 14 is connected to forming circuits 32 which are functionally similar to the forming circuits 16 and which produce the set of seven reference tone signals. These reference tones are connected, together with the phase locked outputs of dividing devices 28a, b . . . g, to the phase meters 34a . . . g which together provide a precise and unambiguous indication of the distance from satellite 10 to the antenna 22 at the navigator's station.

Operation of the invention will now be briefly summarized. Transmitter 20, on the satellite 10, broadcasts a carrier signal which includes multifrequency tone modulations that are coherent with similar multifrequency reference tone signals that are derived from the oscillator 14 at the navigator's station. This modulated broadcast signal is received by antenna 22 at the navigator's station and demodulated by component 30 to provide a set of tone signals which, in addition to the range phase shift information, also includes appreciable noise (and possibly jamming) energy because the tone circuits in the demodulator 30 must be somewhat broadbanded to handle doppler induced frequency shifts. If the set of tone signals produced by demodulator 30 were to be phase compared with the reference tone signals produced by forming circuits 32, the system sensitivity would be adversely effected because of the noise (and jamming) energy present in the demodulated tone signals.

The reference tones from forming circuits 32 are instead compared, according to a major feature of the present invention, with a set of noise free tone signals that are phase locked with the demodulated tone signals and produced by dividing devices 28a, b . . . g from the output signal of the tracking filter 24 and frequency locked oscillator 26 which is a noise free signal at the frequency of the received carrier (including the doppler frequency shift). Comparing the reference tone signals with the phase of the noise free tone set produced by dividing devices 28a, b . . . g, rather than with the "noisy" set of tone signals produced by the demodulator 30, increases the system sensitivity (and reduces the effectiveness of jamming) by as much as 10 db.

It is by now apparent that there has been disclosed an improved navigation system which includes artificial earth satellites and wherein system sensitivity is increased, and the probability of effective enemy jamming is decreased, by including means in the receiver at the navigator's station which produce noise free tone signals that are phase locked to relatively noisy tone signals received from the satellite. Obviously many modifications and variations of the present invention are possible in the light of the above teachings. It is therefore to be understood, that within the scope of the appended claims, the invention may be practiced otherwise than as specifically described.

What is claimed and desired to be secured by letters patent of the United States is:

1. A navigation system comprising:
   at least one artificial earth satellite means, each of which broadcasts a carrier frequency signal that is modulated by a set of multifrequency tone signals, said carrier frequency signal and said set of tone signals being derived from the output of a very stable oscillator included in each satellite means;
   reference tone producing means located at the navigator's station for producing a set of reference multifrequency tone signals that are identical in frequencies to said set of tone signals produced on each of said satellites, said reference tone signals being derived from a very stable oscillator which is synchronized with said stable oscillator included in each satellite means;
   receiver means for selectively receiving a modulated carrier signal braodcast by a satellite and for producing therefrom a set of pure multifrequency tone signals which are phase locked with the modulations of said received signal and are substantially free of the noise and jamming distortions which may be present in said received signal, and
   phase comparison means connected to receive said sets of multifrequency pure and reference tone signals and for indicating the phase difference between similar frequency signals of said sets of tone signals.

2. The navigation system set forth in claim 1 wherein said receiver means comprises:
   an antenna;
   a carrier frequency tracking filter connected to said antenna;
   a variable frequency oscillator connected to be frequency locked to the output of said tracking filter whereby the output signal of said variable frequency oscillator is substantially free of the noise and jamming distortion which may be present in said received signal;
   demodulator means connected to said antenna for producing from said received signal a set of multifrequency demodulated tone signals which may include noise and jamming distortions, and
   dividing and phase lock loop means connected to said variable frequency oscillator and to said demodulator means for producing said set of pure multifrequency tone signals.

3. A receiver for use with a navigation system that includes at least one artificial earth satellite which broadcasts a carrier frequency signal that is modulated by a set of multifrequency tone signals, said receiver comprising:
   an antenna for receiving said broadcast signal;
   a carrier frequency tracking filter connected to said antenna;
   a variable frequency oscillator connected to be frequency locked to the output of said tracking filter whereby the output signal of said variable frequency oscillator is substantially free of the noise and jamming distortion which may be present in said received signal;
   demodulator means connected to said antenna for producing from said received signal a set of multifrequency demodulated tone signals which may include noise and jamming distortions, and
   dividing and phase lock loop means connected to said variable frequency oscillator and to said demodulator means for producing a set of pure tone signals which are phase locked with said set of multifrequency demodulated tone signals and are substantially free of the noise and jamming distortions which may be present in said set of demodulated tone signals.

4. A receiver comprising:
   an antenna for receiving a carrier frequency signal that is modulated by a set of multifrequency tone signals;
   a carrier frequency tracking filter connected to said antenna;
   a variable frequency oscillator connected to be frequency locked to the output of said tracking filter whereby the output signal of said variable frequency oscillator is substantially free of the noise and jamming distortion which may be present in said received signal;
   demodulator means connected to said antenna for producing from said received signal a set of multifrequency demodulated tone signals which may include noise and jamming distortions, and
   dividing and phase lock loop means connected to said variable frequency oscillator and to said demodulator means for producing a set of pure tone signals which are phase locked with said set of multifrequency demodulated tone signals and are substantially free of the noise and jamming distortions which may be present in said set of demodulated tone signals.

* * * * *